(12) United States Patent
Kitchen

(10) Patent No.: US 6,837,439 B2
(45) Date of Patent: Jan. 4, 2005

(54) SYSTEM CONFIGURATION DEVICE SECURITY

(75) Inventor: James Robert Kitchen, Tadley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/945,361

(22) Filed: Aug. 31, 2001

(65) Prior Publication Data

US 2002/0050516 A1 May 2, 2002

(30) Foreign Application Priority Data

Aug. 31, 2000 (GB) ............................................. 0021456
Jan. 17, 2001 (GB) ............................................. 0101215

(51) Int. Cl.⁷ ............................................. G06K 19/06
(52) U.S. Cl. ....................... 235/492; 235/375; 235/379; 235/380; 235/441; 235/487
(58) Field of Search ............................... 235/492, 379, 235/380, 375, 441, 487

(56) References Cited

U.S. PATENT DOCUMENTS

| | | | |
|---|---|---|---|
| 4,774,399 A | * 9/1988 | Fujita et al. | 235/441 |
| 5,242,310 A | * 9/1993 | Leung | 439/76.1 |
| 5,265,951 A | * 11/1993 | Kumar | 312/223.2 |
| 5,532,466 A | 7/1996 | Konno et al. | 235/441 |
| 5,803,762 A | 9/1998 | Green | |
| 5,905,252 A | 5/1999 | Magana | 235/475 |
| 5,991,875 A | * 11/1999 | Paul | 713/2 |
| 6,042,010 A | 3/2000 | Kanayama et al. | 235/449 |
| 6,382,508 B1 | * 5/2002 | Bleier | 235/441 |
| 6,454,164 B1 | * 9/2002 | Wakabayashi et al. | 235/380 |
| 6,465,880 B1 | * 10/2002 | Dobashi et al. | 257/679 |

FOREIGN PATENT DOCUMENTS

| | | | | |
|---|---|---|---|---|
| JP | 402018691 A1 | * | 1/1990 | G06K/17/00 |
| JP | 403083480 A | * | 4/1991 | H04Q/9/00 |
| JP | 06-156152 | | 7/1994 | |

OTHER PUBLICATIONS

International Search Report application No. PCT/US01/27318, mailed Feb. 22, 2002.
PCT Application No. PCT/EP95/03745, filed Sep. 22, 1995.
German patent No. DE19922063A1, issued Nov. 23, 2000.
European Search Report application No. GB0101215.2, mailed Mar. 28, 2002.

* cited by examiner

*Primary Examiner*—Steven S. Paik
(74) *Attorney, Agent, or Firm*—Meyertons Hood Kivlin Kowert & Goetzel, P.C.; B. Noël Kivlin

(57) ABSTRACT

A system configuration device provides system configuration information to a system unit. The device, for example a card, includes a circuit, circuit contacts, and a notch in one edge of thereof. The notch is configured to cooperate with a restraint when located in a card reading station for securing the card in the card reading station. A system configuration card reading station comprises a card receiver defining a slot for receiving the card, and a card reader including card reader contacts for contacting the circuit contacts on the card. The card reader contacts are located so as to contact the circuit contacts on the card when the card is received within the slot. The card receiver is configured to enable a restraint to engage the notch in the card for securing the card in the card reading station when the card is received within the slot. The restraint could be in the form, for example, of a padlock, a cable tie, or the like, to be operated manually, or it could be, for example a sprung or solenoid operated latch to be operated automatically.

37 Claims, 12 Drawing Sheets

SYSTEM CONFIGURATION DEVICE SECURITY

The use of a portable storage device, such as a system configuration card, for giving a network identity to network connectable equipment has been proposed in co-pending U.S. patent application Ser. No. 09/804,614, filed Mar. 12, 2001, which is assigned to the present assignee and claims priority from UK patent application 0021456.9, filed Aug. 31, 2000. The whole content and disclosure of U.S. patent application Ser. No. 09/804,614 is incorporated herein by reference.

BACKGROUND OF THE INVENTION

This invention relates to securing portable storage devices.

One example of a portable storage device proposed in UK patent application 0021456.9 is in the form of a so-called smart card. Network connectable equipment is provided with a card reader for reading a smart card. The proposed use of a system configuration card provides many advantages. One advantage is the ease of transfer of a network identity between units in the event, for example, where a unit connected to a network develops a fault and needs to be replaced. The system configuration card can hold much more information than merely the network identity and typically this will be the case.

However, the advantages of the use of a system configuration card, or other portable storage devices used for system configuration also bring disadvantages, in that it would be possible for a card to be accidentally or deliberately removed or exchanged between system units. This could result in system units and/or the network failing or not operating correctly.

There is a need, therefore, to improve security for a portable storage device.

SUMMARY OF THE INVENTION

A first aspect of the invention provides a portable storage device operable to provide system configuration information to a system unit. The storage device includes a circuit, a circuit interface and an opening at an edge of the device, that is in or near the edge of the device. The opening is configured to be engaged by a restraint when the device is located at a device reading station for retaining the device at the device reading station.

In a particular example, the portable storage device is a system configuration card and the opening is a notch in the edge of the card.

The use of the opening in the storage device means that the device can be inserted within a device receiver, and then the restraint can be engaged with the opening. This enables variable levels of security to be applied with regard to the prevention of the removal of the device. The user is able to choose whether to provide high security, for example to prevent an unauthorised person from deliberately removing the device, or a low level of security where the user is merely interested in preventing inadvertent removal of the device. For example, the restraint could be a padlock or a wire with a seal to provide a high degree of security, or a cable tie to provide a lower degree of security. Where the opening is a notch in an edge of the device, for example in the edge of a card, this provides the advantage that the device reading station can be kept compact and still permit the restraint to be applied.

The system configuration card can be a conventional smart card, except that it is provided with the aforementioned notch and is provided with system configuration information. Thus the card can be rectangular, having two shorter edges at opposite ends of the card and two longer edges at opposite sides of the card, the notch being provided in one of the shorter edges. Circuit contacts forming a circuit interface are typically located towards one of the shorter edges at one end of the card with the notch being formed in the shorter edge at the other end of the card. This enables the provision of means for applying the restraint to be located at the exterior of the card reading station.

Another aspect of the invention provides a reading station for reading a portable storage device operable to provide system configuration information to a system unit. The reading station includes a device receiver configured to receive the device and a device reader operable to interface with the circuit interface when the device is received in the device receiver. The device receiver is further configured to enable a restraint to engage the opening in the device to retain the device at the reading station.

The device receiver can include a formation defining a passage configured to receive the portable storage device. A hole can be formed in the formation, which hole passes between opposite surfaces of the formation and through the passage at a position corresponding to that occupied by the opening in the device when received at a reading position in the reading station. A restraint can be manually insertable through the hole to engage the opening in the device, thereby retaining the device in the reading station.

The device receiver can be mountable in a wall of a system unit. For example, the device receiver can include a formation that includes a first portion of larger cross-sectional area that defines a protuberance to project from the wall and a second portion of smaller cross-sectional area to be received within an aperture in the wall, the passage passing through both portions of the device receiver to define a through passage that passes though the wall of the system unit.

The second portion of smaller cross-sectional area can include wedge-shaped detents configured, for mounting of the device receiver in the aperture in the wall, to pass through the aperture in the wall and to latch behind the wall when the device receiver is fully inserted.

The passage can be slot-shaped so as to receive a portable storage device in the form of a system configuration card.

A further aspect of the invention provides a computer system comprising a reading station as set out above for reading a portable storage device operable to provide system configuration information to the computer system.

Another aspect of the invention provides a method of securing a portable storage device operable to provide system configuration information to a system unit in a reading station in the system unit, the method comprising:

providing a portable storage device that includes a circuit, a circuit interface and an opening at an edge of the device;

inserting the device in a device receiving passage in a device receiver until the circuit interface interfaces with a device reader; and engaging a restraint with the opening to secure the device in the reading station.

A particular application of a portable storage device for system configuration, e.g., a card, is in the context of a rack-mountable computer server. In the event of the computer server developing a fault, it can then be removed from the racking. The system configuration card can be removed from the faulty unit and then be inserted in a replacement unit, which replacement unit can then be replaced in the racking. It will be appreciated that this provides a convenient, efficient and rapid and reliable method of transferring system configuration information between system units. The provision of a mechanism for providing a restraint for the system configuration card means that this approach to system configuration can be used in a secure manner.

Further aspects and advantages of the invention will become apparent from the following description of a preferred embodiment.

BRIEF DESCRIPTION OF THE DRAWINGS

Embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described in the following with reference to the accompanying drawings.

An exemplary embodiment of the present invention will now be described, by way of example only.

Figure 1:
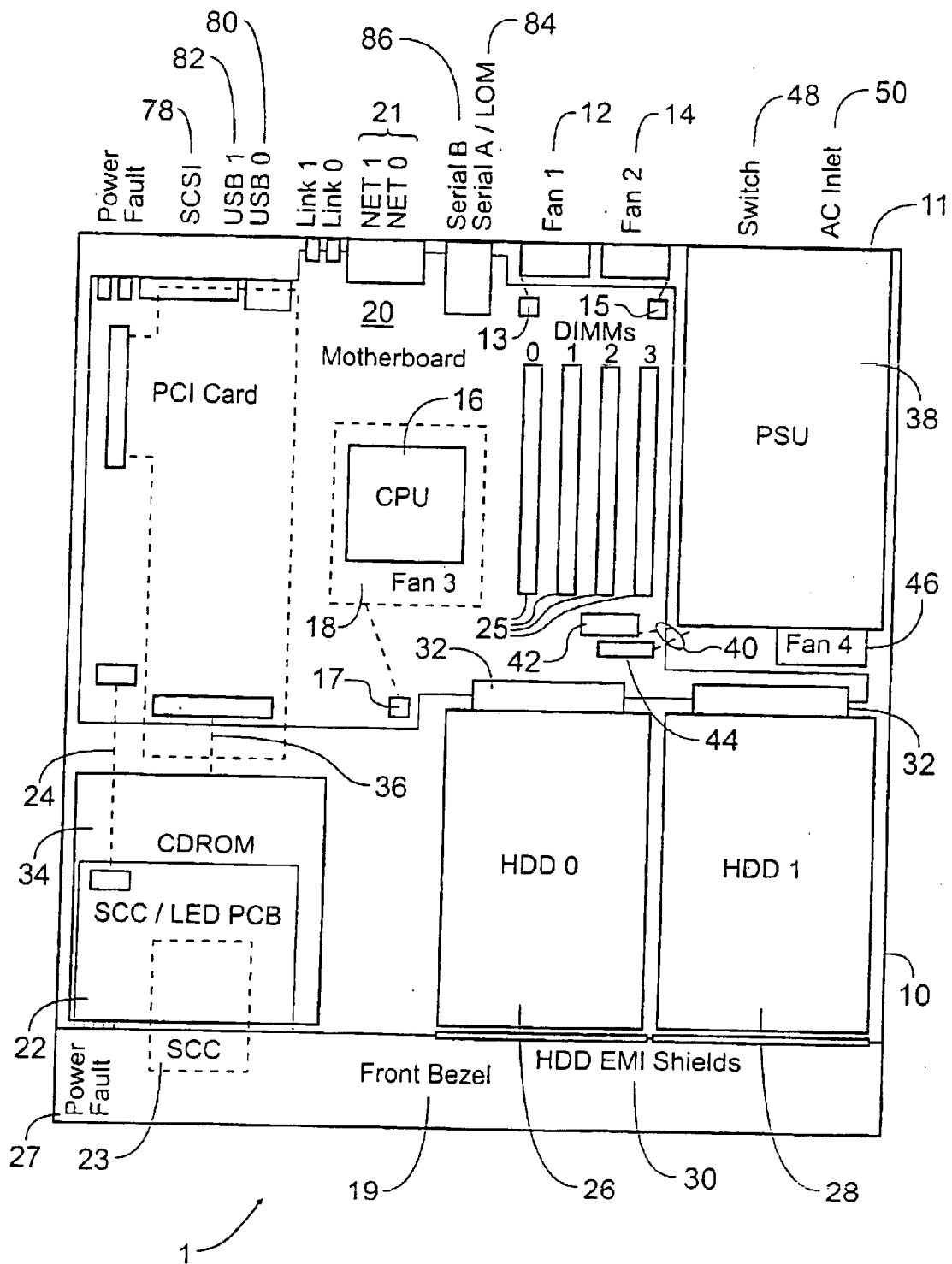
FIG. 1 is a physical plan view of a computer system that implements an embodiment of the invention.

FIG. 1 is a physical plan view of narrow form-factor computer system 1 designed for rack mounting. This computer system is compactly configured while offering high performance at reasonable cost.

The computer system 1 comprises a housing 10 with a front bezel 19 that is removable for front access to the disk drives and a System Configuration Card (SCC) 23 and reader 22. The computer system can be rack mounted in, for example, standard 19" racks, using right-angled flanges or a sliding-rail mechanism (not shown), for example.

The housing 10 is cooled, from front to rear, by two system fans 12, 14 mounted on a rear panel of the housing, with venting in the front and rear panels as required. The host processor (CPU) 16 also has its own dedicated local cooling comprising an impingement fan 18 that clips onto the CPU socket. These three fans plug directly into the motherboard 20 at 13, 15 and 17, respectively. The motherboard 20 is a PCB assembly, designed in a custom form-factor to fit the housing 10. The shape of the motherboard is chosen so as to minimise cabling within the housing. The motherboard 20 carries the majority of circuitry within the computer system 1.

All external interfaces are included directly on the rear edge of the motherboard, for access through the rear-panel 11 of the housing 10. The external interfaces comprise two network interfaces 21, two serial interfaces 84, 86 and a Small Computer System Interface (SCSI) interface 78. Indicators for Power, Fault and Network Link status are also positioned at the rear of the housing.

A system, or host, processor (CPU) 16 for the computer system 1 is mounted in a standard 370 pin zero insertion force (ZIF) socket on the motherboard 20. It has a passive heat sink. Dual in-line memory modules (DIMMs) are mounted in sockets 25 on the motherboard 20. A small printed circuit board (PCB) 22 is included at the front of the housing 10 to carry a reader for a System Configuration Card (SCC) 23 and LEDs 27 for Power and Fault status indication. A 10-way ribbon cable 24 connects this PCB to the motherboard 20. Two SCSI hard disk drives 26 and 28 are mountable in respective bays to the front of the motherboard 20. The drives are hot pluggable and are accessible by removal of the front bezel 19 and EMI shields 30. The two internal SCSI hard disk drives 26 and 28 plug directly into the motherboard via right-angled connectors 32 located on the front edge of the motherboard 20.

A slim (notebook-style) CDROM drive bay is provided, mounted laterally in front of the motherboard, for a CDROM drive 34. Compact disks may be inserted and removed via an access slot (not shown) located on the lower left side of the front bezel 19. A connector at the rear of the CDROM bay connects the CDROM drive 34 via a ribbon cable 36 to the motherboard 20.

A Power Supply Unit (PSU) 38 is connected to the motherboard via a short harness 40 with two mating connectors 42 and 44 for power and services. The PSU 38 has its own cooling fan 46 and additionally houses the system power switch 48 and power input connector(s) 50.

Figure 2:
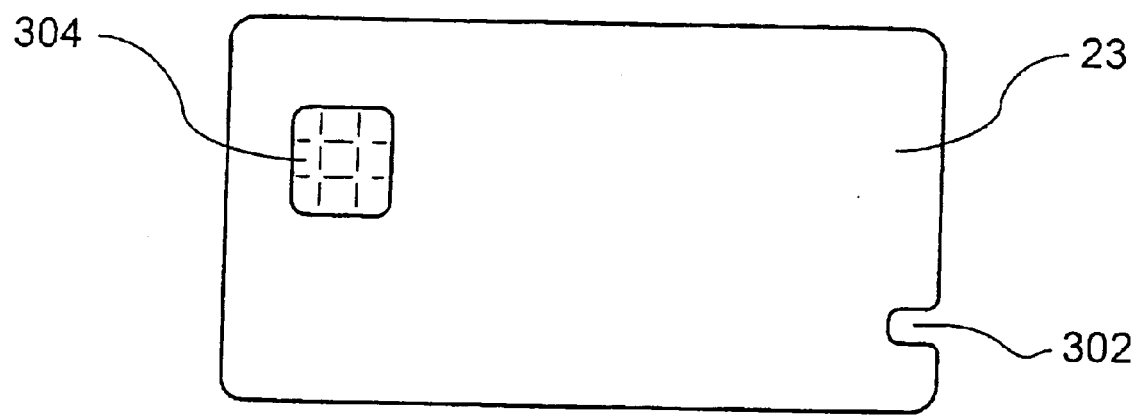
FIG. 2 is a schematic representation of a system configuration card in accordance with an embodiment of the invention.

FIG. 2 is a schematic representation of a system configuration card that forms an example of a portable storage device in accordance with an embodiment of the present invention. The system configuration card 23 can be a conventionally sized smart card having an integrated circuit embedded in the card with circuit contacts 304 on one surface of the card. A system configuration card 23 is substantially rectangular with two longer sides and two shorter sides. In an embodiment of the invention, an opening 302 is provided at one of the shorter sides of the card at the opposite end to the circuit and circuit contacts 304. In the present example, the opening is a notch 302 formed in one of the shorter edges of the card. However, in another example, the notch in an edge could be replaced by a hole near the edge of the card.

Figure 3:
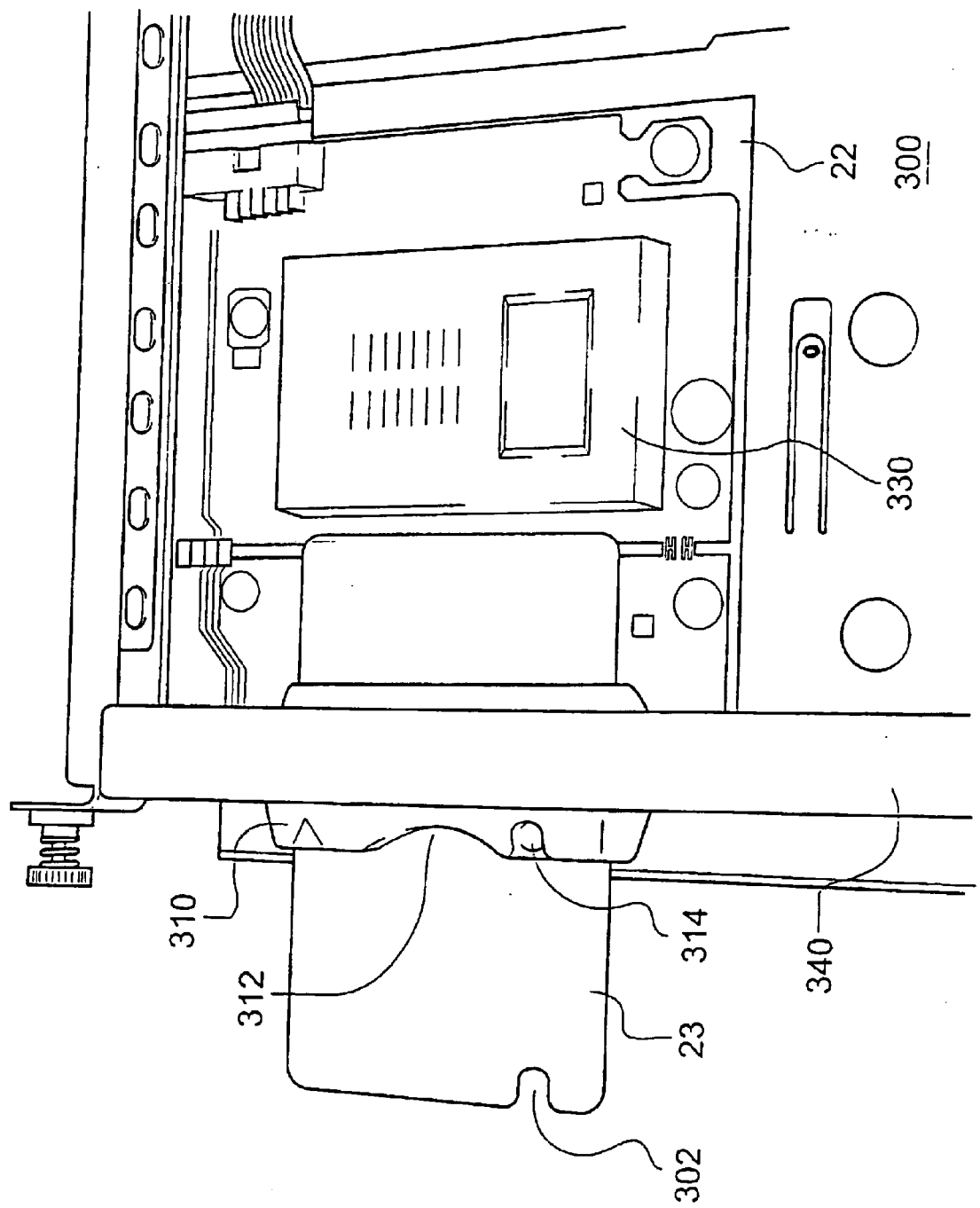
FIG. 3 illustrates such a system configuration card being inserted into a system card configuration reading station of the computer system of claim 1.

FIG. 3 shows a system configuration card 23 (as shown in FIG. 2) being inserted into a card reading station 350 that comprises a card receiver 310 and a card reader 330 mounted on the PCB 22 mentioned with reference to FIG. 1.

The system configuration card 23 is shown with the printed circuit on the underside for being read by the card reader 330. The card receiver 310 of the present example provides a slot-shaped passage for receiving the system configuration card 23 and for guiding the system configuration card into the card reader 330. The card receiver 310 is provided with a hole 314 through which a locking device can be inserted for securing the card in the inserted position. As shown in FIG. 3, with the card 23 partially inserted, the hole 314 is blocked by the card 23.

Figure 4:
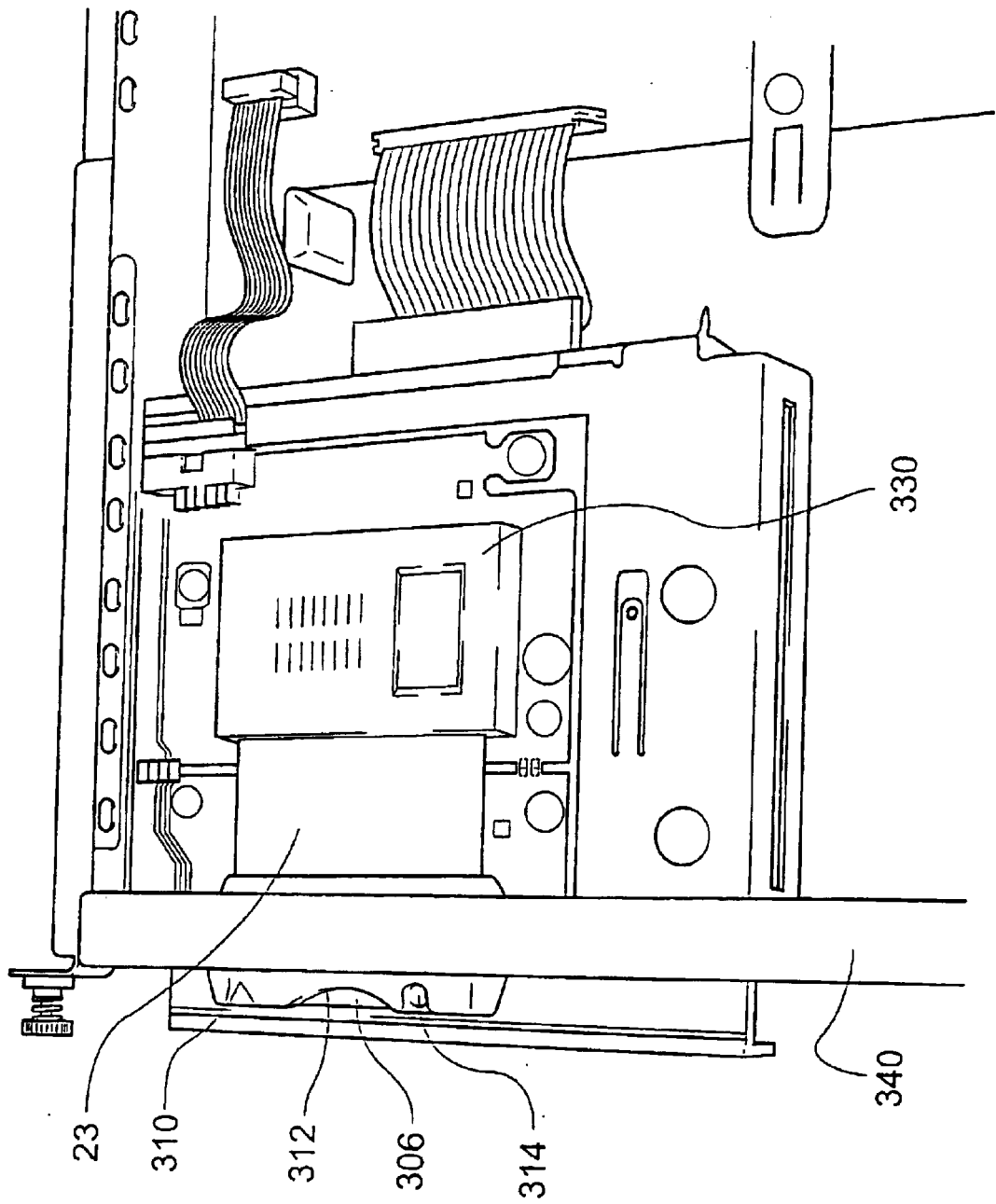
FIG. 4 illustrates the system configuration card fully inserted in the card reading station.

However, when the card 23 is fully inserted, as shown in FIG. 4, at which time the circuit contacts in the card are in contact with card reader contacts (not shown) provided within the card reader 330, the hole 314 in the card receiver 310 aligns with the notch 302 in the card 23. In this position, a locking device, for example a padlock, a wire with a seal, a cable tie, or the like, may be inserted through the hole 314 to lock the card in place. In the fully inserted position as shown in FIG. 4, it will be noted that a small portion 306 of the card is still visible in a recess 312 in the card receiver 310, whereby the end of the card can be gripped to pull the card out of the card reader 330 assuming that a restraint or locking device is not provided through the hole 314 at that time.

It will be appreciated that the provision of the opening 302 at (i.e. in or near) the edge of the card permits a hole 314 for receiving the restraint to be provided in a compact device receiver formation.

The integrated circuit in the system configuration card 23 includes memory that is used for holding system configuration information including, for example, a network identity for the computer system 1. The network identity can include, for example, a Media Access Control (MAC) address. When a card is fully inserted in the card reader 330, the computer system 1 is operable to read the system configuration information contained in the memory. This is then used by the computer system for configuration purposes and/or for identifying itself to a network to which it is connected.

FIGS. 5-8 illustrate a first example of the card receiver in more detail.

Figure 5:
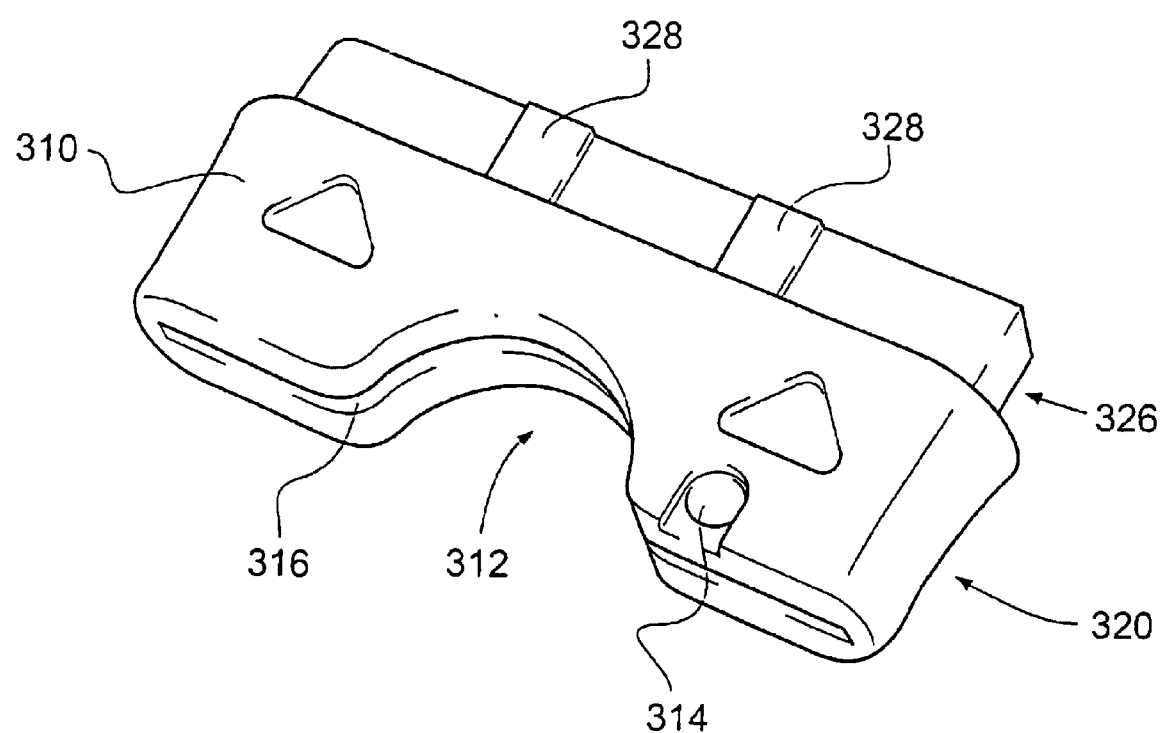
FIG. 5 is a perspective view of one example of a card receiver for the card reading station shown in FIGS. 3 and 4.

FIG. 5 is a perspective view of the first example of the card receiver 310. This includes a front portion 320 of larger cross section and a rear portion 326 of smaller cross section. The rear portion 326 has two wedge shaped detent members 328 on an upper surface and two further wedge shaped detent members 328 on a lower surface, whereby the card receiver 310 may be inserted through an aperture in the front wall 340 of the computer system housing until that front wall abuts against the end of the front portion 320 of the card receiver 310. At that point, the wedge shaped detent members 328 latch behind the front wall 330 of the computer system housing securing the card receiver in place.

As can be seen in FIG. 5, the front portion 320 of the card receiver 310 is provided with a recessed portion 312 that provides an area for gripping a card, when inserted in the card receiver, in order to remove the card. A restraining device (restraint) such as, for example, a padlock, a wire with a seal, a cable tie, or the like, may be inserted through the hole 314 to engage with the notch on a card 23, as previously described.

Figure 6:
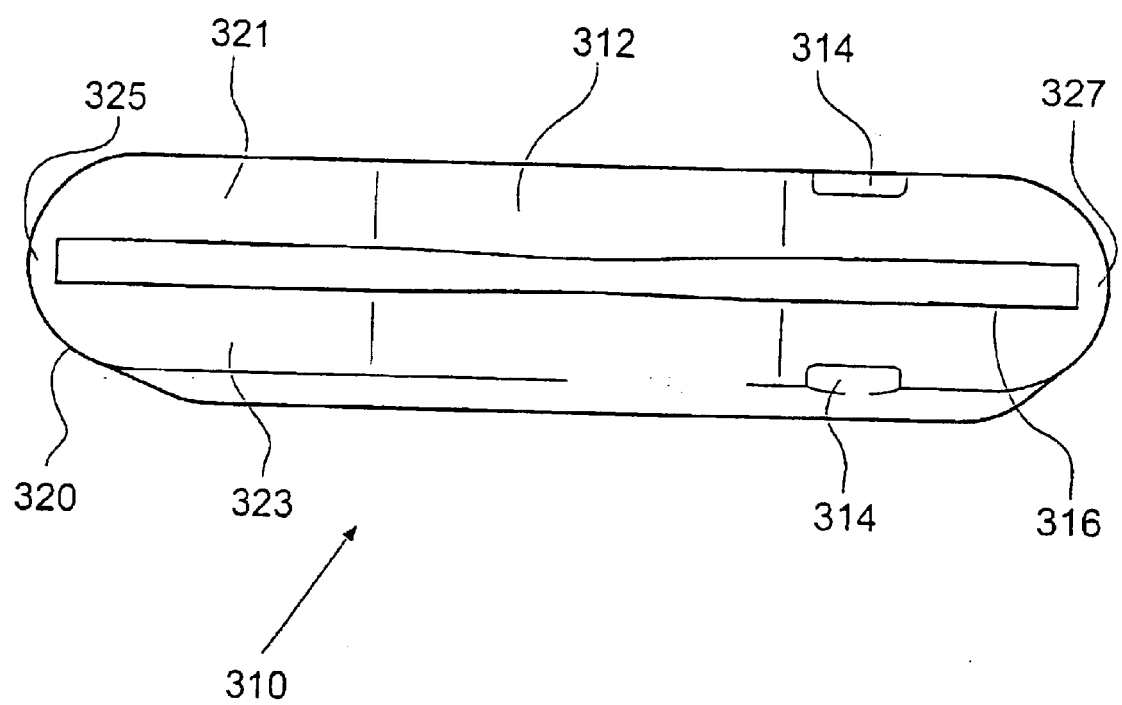
FIG. 6 is a front view of the card receiver of FIG. 5.

FIG. 6 is a front view of the card receiver 310 of FIG. 5, which shows, in particular, the front portion 320 of the card receiver 310. FIG. 6 clearly shows an upper portion 321 and a lower portion 323 of the card receiver, with end portions 325 and 327, to define between them a card receiving slot 316. FIG. 6 also shows the recessed portion 312, as well as the top and the bottom of the hole 314 that passes through the upper and lower portions 321 and 323 of the card receiver 310.

Figure 7:
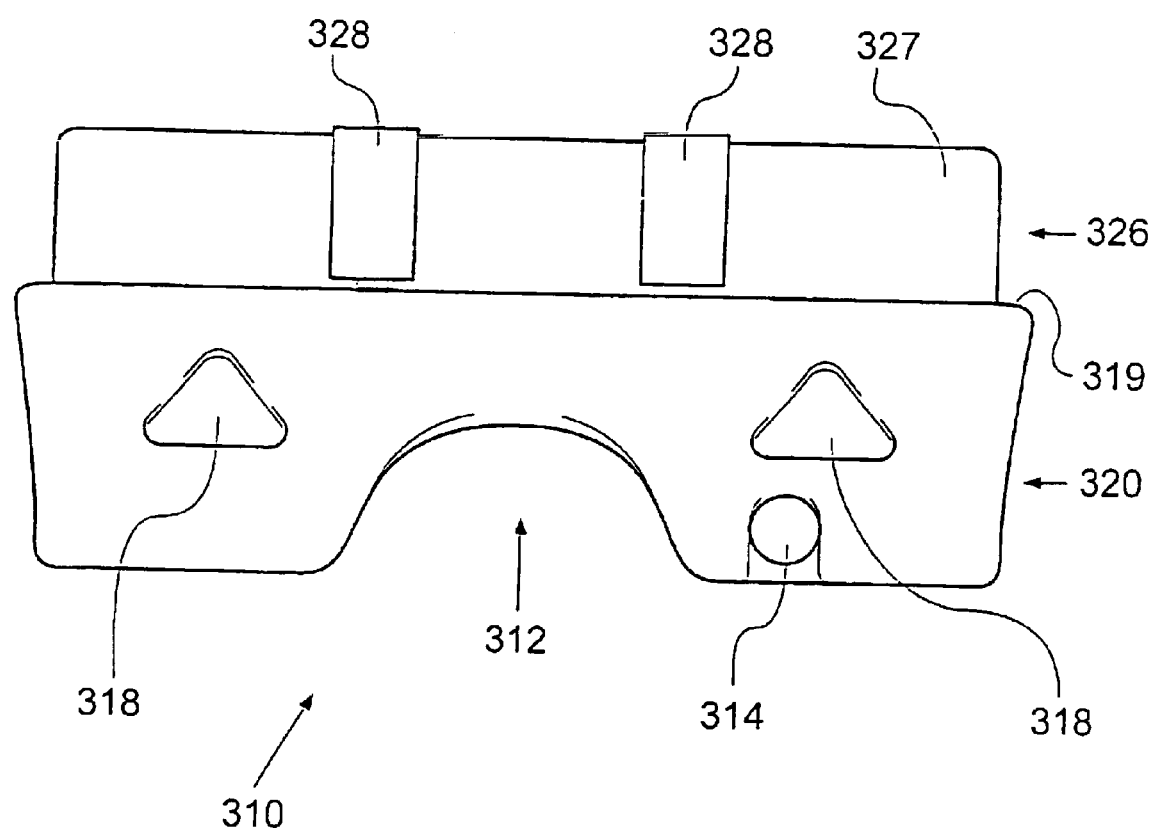
FIG. 7 is a plan view of the card receiver of FIG. 5.

FIG. 7 is a plan view of an example of the card receiver 310 of FIG. 5 showing in more detail the hole 314 and the recessed portion 312 of the front portion 320 of the card receiver. The triangular marks 318 indicate a direction of insertion of the card receiver. FIG. 7 further shows the wedge shaped portions 328 that overlie the portion 327 of reduced cross section forming the rear portion 326 of the card receiver 310. As shown in FIG. 7, the wedges 328 stop just short of the rear face of the front portion 320, whereby a narrow gap is formed between the wedges 328 and the rear face 319 of the front portion 320 to effect latching of the card receiver in the aperture in the front wall 340 of the computer system housing.

Figure 8:
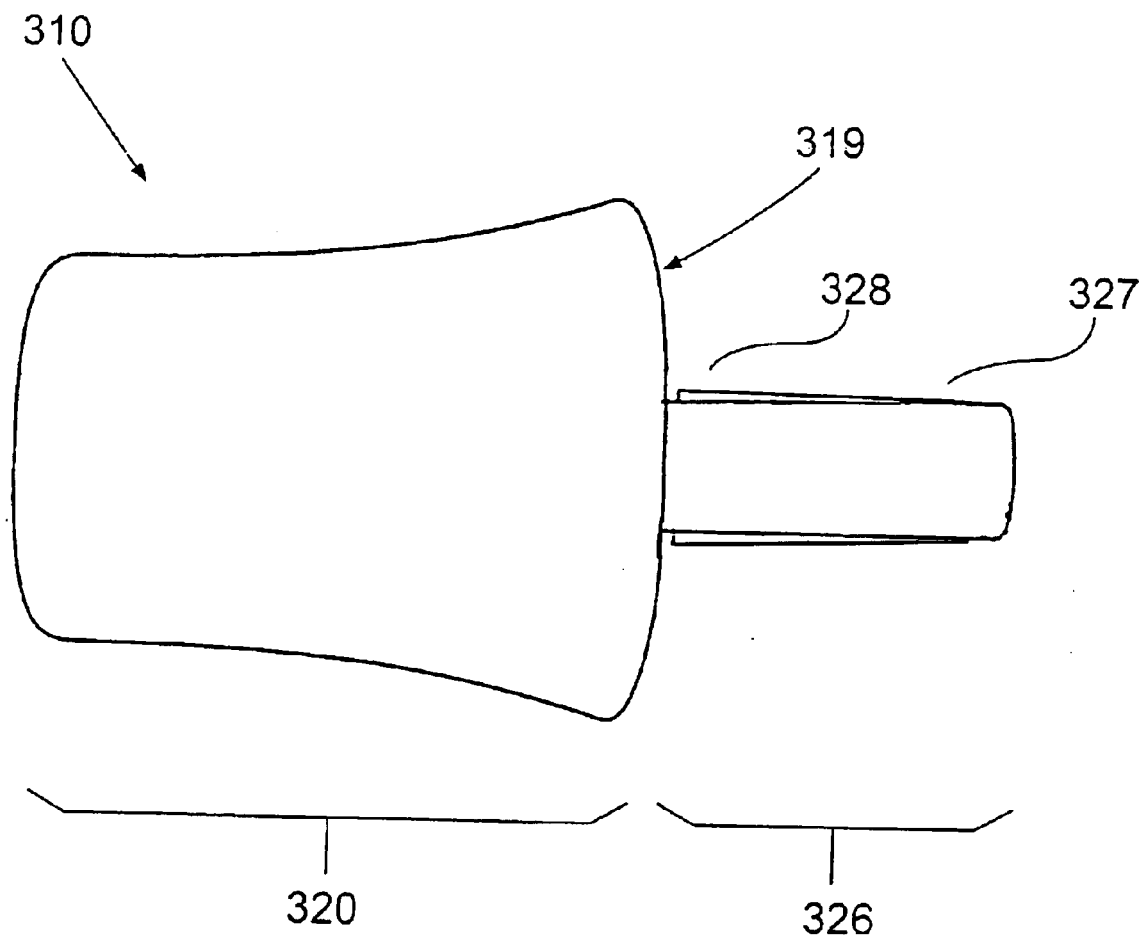
FIG. 8 is a side view of the card receiver of FIG. 5.

FIG. 8 is a side view of the card receiver 310 of FIG. 5 showing the front portion 320, the rear portion 326 including the portion 327 of reduced cross section and the wedges 328.

The card receiver can be made from a plastics material such as a PC+ABS material, for example from GE CYCOLOY C6200.

Figure 9:
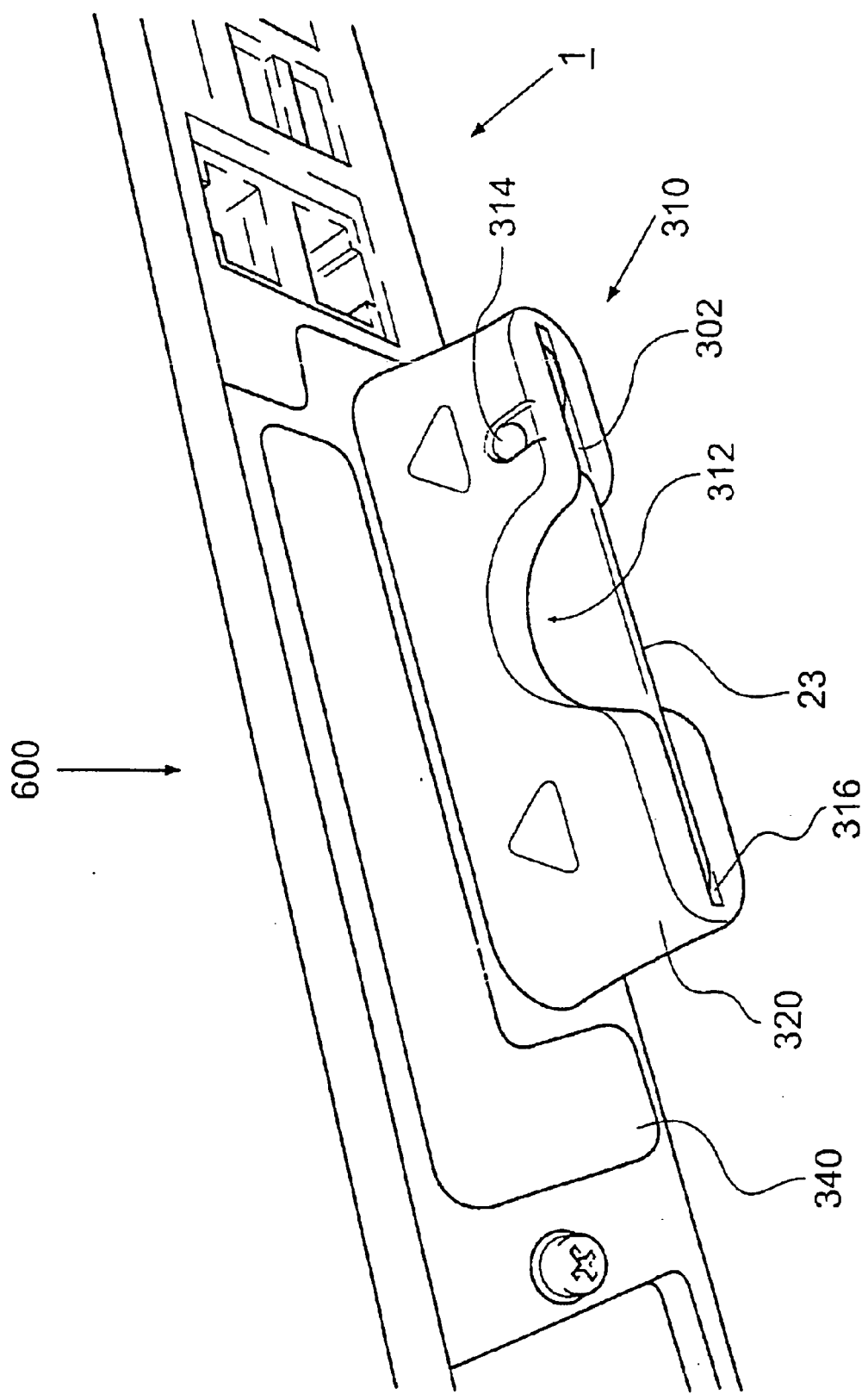
FIG. 9 is a perspective view of another example of a card receiver in a rear wall of the computer system of FIG. 1 from the outside of the computer system.

FIG. 9 is a view of an alternative example of a card receiver 310 inserted in an opening in the rear wall 340 of the computer system 1 of FIG. 1. It can be seen that the front portion 320 of the card receiver 310 shown in FIG. 9 corresponds to the front portion 320 of the card receiver 310 shown in FIG. 5. Accordingly, like reference signs have been used for like components. FIG. 9 shows a card fully inserted within the card receiver 310, whereby the notch 302 is aligned with the through hole 314, whereby a restraint may be inserted through the through hole and the notch 302 as described earlier.

FIG. 9 also shows a cover 600 of the computer system 1.

Figure 10:
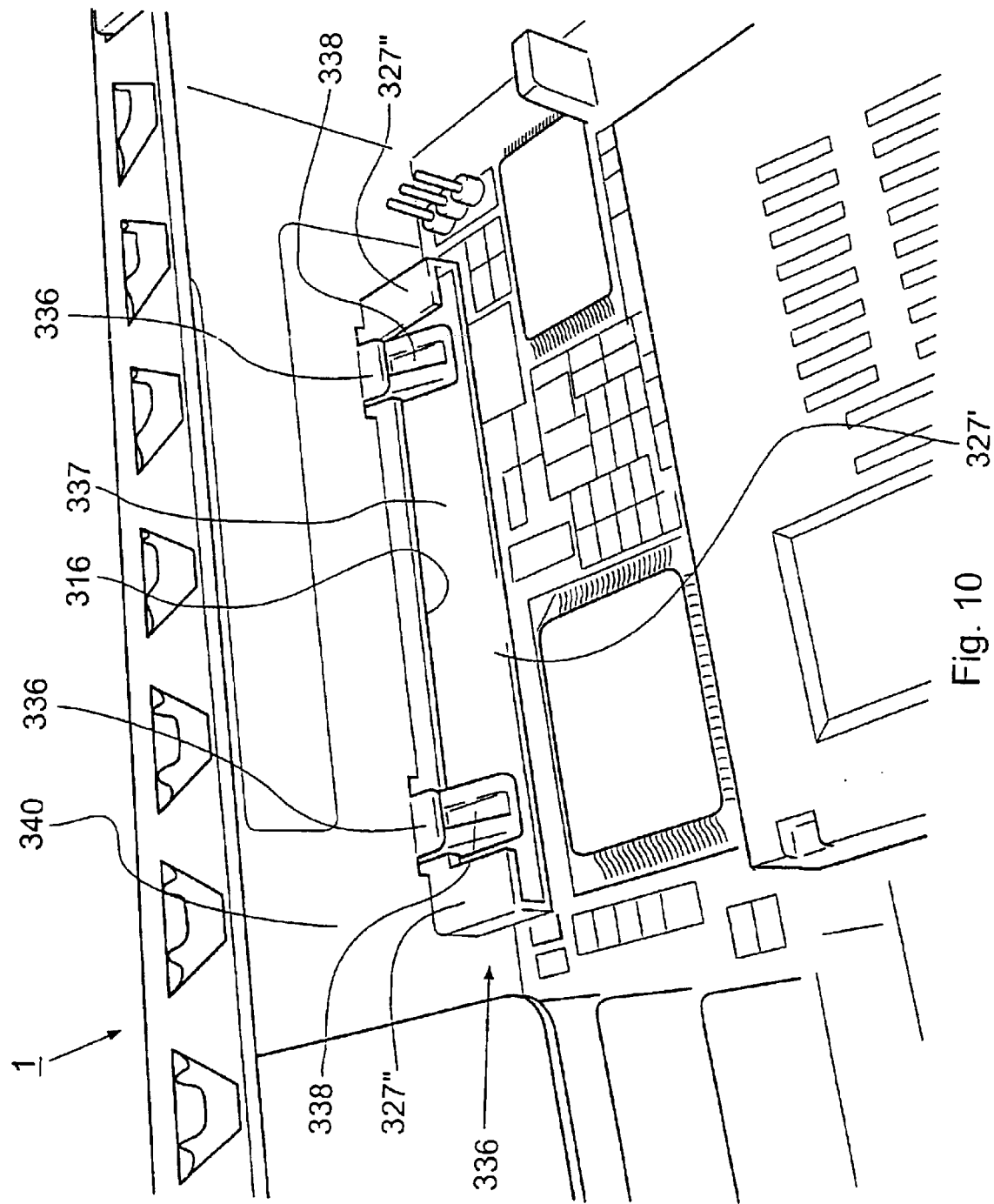
FIG. 10 is an internal view of the computer system showing the card receiver of FIG. 9.

FIG. 10 illustrates an interior view of the housing of the computer system 1, showing the rear portion 336 of the alternative version of the card receiver shown in FIG. 9. As seen in FIG. 10, the alternative version 336 of the rear portion of the card receiver shown in FIGS. 9 and 10 includes a cut out 337 in the rear wall 327, whereby the rear wall 327 extends along a lower portion 327', the sides, and two regions 327" at the edge of the card slot. Two wedge shaped detents (not shown) are provided on the lower surface of the lower portion 327' of the surrounding wall 327, in a similar manner to that of the wedges 328 shown in FIGS. 5 and 7. In this alternative example of the card receiver 310, as shown in FIG. 10 two wedge shaped fingers 338 are provided within the cut out portion 337. The wedges 338 are designed to latch against tabs 336 that are bent back from the computer system housing wall 340. As a result of the engagement between the wedge shaped portions and the tabs 336, the wedge shaped portions 338 are caused to deflect slightly downwards into the card slot 316. This means that when a card 23 is inserted in the card receiving slot 316, the underside of the wedge shaped portions 318 presses lightly on the card 23, to assist in securing the card in place and preventing undesirable movement of the card with respect to the card reader 330.

Figure 11:
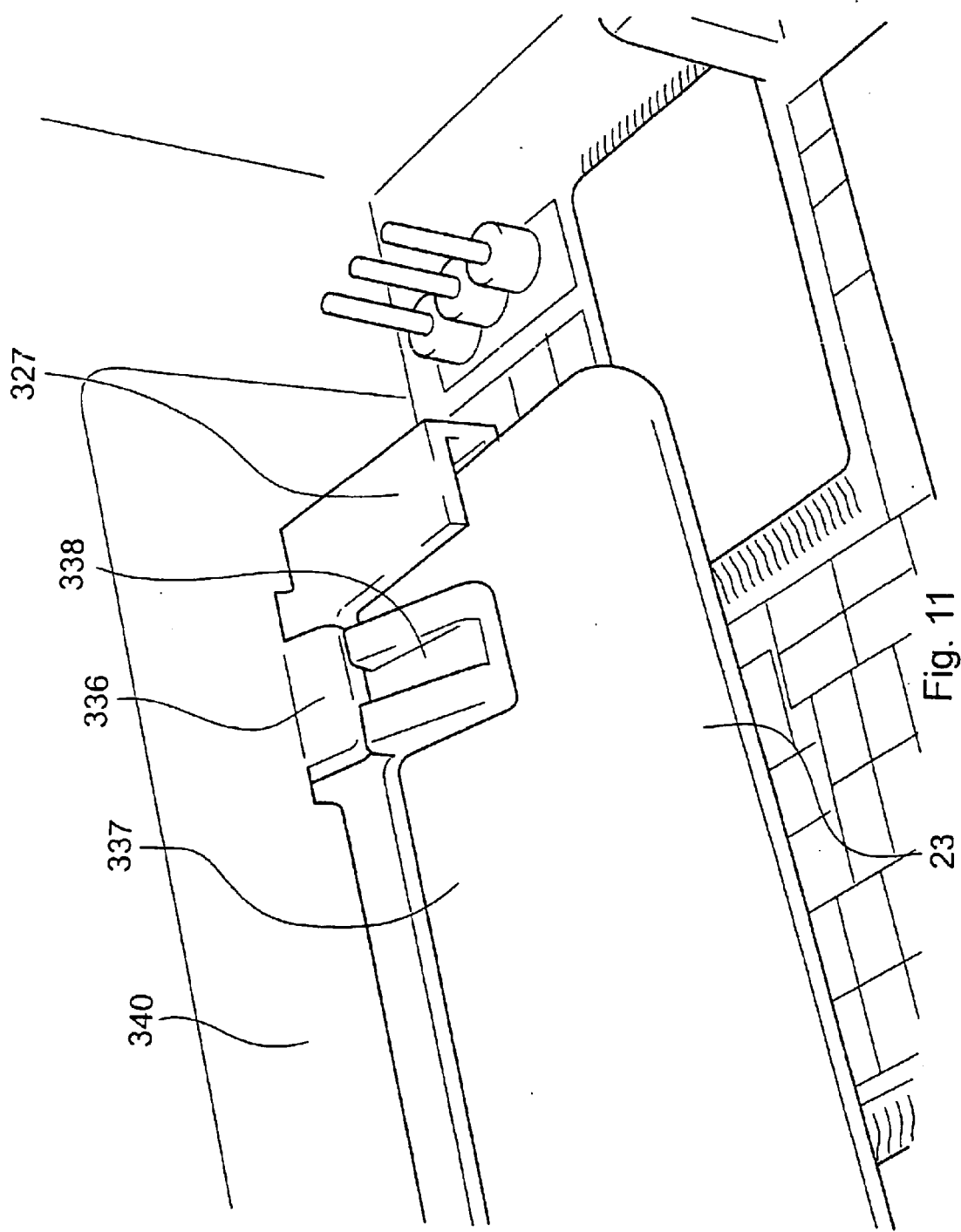
FIG. 11 is a detail of the card receiver of FIGS. 9 and 10 with a card partially inserted therein.

FIG. 11 illustrates a detail of the card receiver 310 of FIGS. 9 and 10, showing how the wedge shaped portion (or finger) 338 presses against the card 23 to assist with the secure location of the card 23. FIG. 11 shows the card 23 partially inserted. The operation of the wedge shaped finger 38 also assists in preventing movement of the card (for example as a result of any vibration applied to the system unit) when it has been fully inserted. It can thereby assist in reducing any danger of affecting the contacting between the circuit contacts on the card and the reader contacts in the card reader 330. The other reference signs used in FIG. 11 correspond to those used in FIG. 10.

Figure 12:
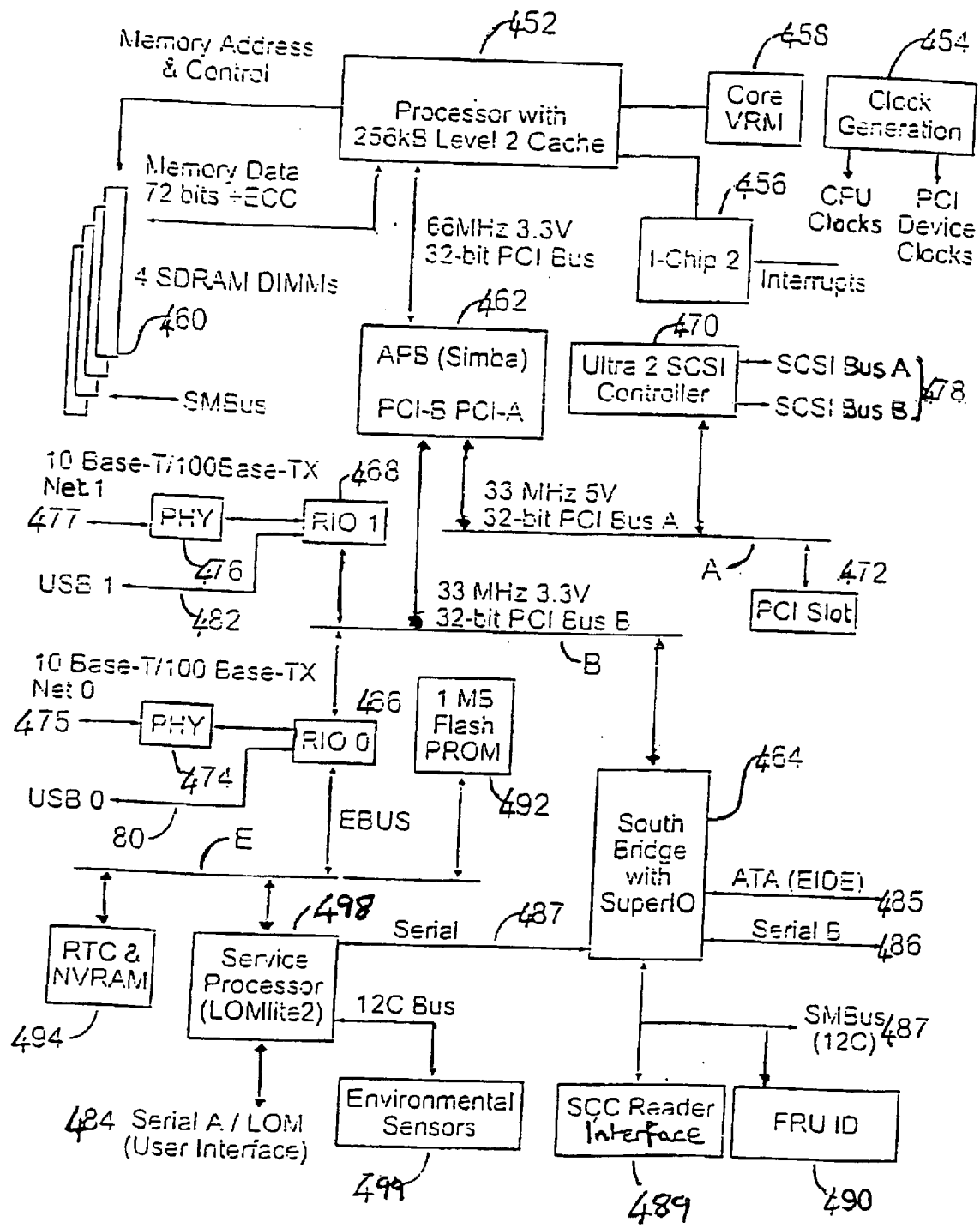
FIG. 12 is a schematic block diagrammatic representation of an example of a system architecture for the computer system of FIG. 1.

FIG. 12 is a schematic block diagrammatic representation of an example of a system architecture for the computer system of FIG. 1.

In this particular example, the CPU 416 of FIG. 12 is an UltraSparc processor 452 available from Sun Microsystems, Inc. In other embodiments other processors could, of course, be used. A configurable clock generator 454 is provided to supply various system clocks. A vectored interrupt Controller (I-Chip2) 456 is provided for handling interrupts. Also provided is a configurable core Voltage Regulator Module (VRM) 458.

Four sockets 425 are provided for commodity Dual Inline Memory Modules (DIMMs) 460. Connections are provided for a 72 bit data path with Error Correction Codes (ECCs). A Personal Computer Interconnect (PCI) bus architecture is provided that includes an Advance PCI Bridge (APB) 462. This PCI Bridge 462 concentrates two secondary PCI busses (PCI Bus A and PCI Bus B) onto a primary PCI bus (PCI Bus) as represented in FIG. 12.

A so-called South Bridge 464 is a commodity PCI IO device used extensively in the PC industry. Among other functions, it implements a dual IDE controller, a System Management Bus (SMBus) controller, two Asynchronous Serial Interfaces and a power management controller. The IDE controller component of the South Bridge 464 supports a maximum of four IDE devices via Primary and Secondary ATA busses 485. The SMBus host controller provides an I2C compatible, synchronous serial channel 487 for communication with devices sharing the SMBus protocol. The SMBus is used to communicate with the DIMMs. It is also used to communicate with the System Configuration Card (SCC) reader interface 489 (for the portable storage device reader 40), with a chip 490 holding information for identifying a field replaceable unit (FRU ID) to obtain configuration information and with the DIMMs 460.

The two Asynchronous Serial Interfaces provide two serial channels (Serial B and Serial) 486 and 487. The Serial B channel 486 connects directly to provide an external port via an RJ45 connector.

The Serial channel 487 is selectively connectable to an external user interface port (Serial A/LOM) 484 having an RJ45 connector via the service processor 498. The service processor 498 selectively connects the external port 484 to, and disconnects the external port 484 from, the serial channel 487 to enable the external port 484 to be used as a combined Console/LOM port. Serial Universal Asynchronous Receiver/Transmitters (UARTs) are located within the South Bridge 464 for controlling the serial communication.

Two Personal Computer IO (PCIO) devices (RIO 0 and RIO 1) 466 and 468 are also provided. These PCIO devices 466 and 468 are positioned on PCI Bus B. The first PCIO device 466 provides EBUS, Ethernet and Universal Serial Bus (USB) interfaces. EBUS is a Sun Microsystems parallel bus compatible with the so-called Industry Standard Architecture (ISA) bus protocol. The second PCIO device 468 implements Ethernet and USB interfaces.

A dual wide (16 bit) Fast-40 (Ultra2SCSI) controller 470 connects two independent SCSI busses (SCSI Bus A and SCSI Bus B) 478 to the PCI Bus A.

FIG. 12 also illustrates a 1 MB Flash PROM 92 for configuration and boot information, and a Real-time Clock with 8 kB Non-Volatile Random Access Memory (NV RAM) 494.

As shown in FIG. 12, a service processor 498 is also provided. In the present example, the service processor 498 is implemented as an embedded microcontroller module based on the Hitachi H8 series of Flash microcontrollers. The module can be directly incorporated onto a motherboard at very low cost.

The microcontroller 498 can be programmed with microcode to control the reading of the portable storage device 23 via the SouthBridge 464 and the SCC reader interface 489 to the device reader 330.

It will be appreciated that the various embodiments of the invention described herein provide an effective way of securing a system configuration card in place within a system unit, for example a computer server. The type of restraining device actually used to pass through the hole 314 and to engage within the notch 302 in the system configuration card can be chosen to achieve a desired degree of security. For example, if it is desired merely to avoid accidental removal of the system configuration card, a simple cable tie, a spring clip, or a peg designed to have an interference fit within the hole 314 could be used. If a greater degree of security is desired, a small padlock (for example, a small padlock such as one would use with a suitcase) could be used. Such a padlock could be key operated, or could be a combination lock. If a greater degree of security is required, then a wire could be passed through the hole 314 and the two ends of the wire could be sealed together using a metal or other seal.

There has been described a system configuration device such as a card for providing system configuration information to a system unit. The card includes a circuit, circuit contacts, and a notch in one edge of the card. The notch is configured to cooperate with a restraint when located in a card reading station for securing the card in the card reading station. A system configuration card reading station comprises a card receiver defining a slot for receiving the card, and a card reader including card reader contacts for contacting the circuit contacts on the card. The card reader contacts are located so as to contact the circuit contacts on the card when the card is received within the slot. The card receiver is configured to enable a restraint to engage the notch in the card for securing the card in the card reading station when the card is received within the slot. The restraint could be in the form, for example, of a padlock, a cable tie, or the like, to be operated manually, or it could be, for example, a sprung or solenoid operated latch to be operated automatically.

Although a particular embodiment of the invention has been described, it will be appreciated that the invention is not limited thereto and that many modifications, including additions, deletions and substitutions may be made within the spirit and scope of the claimed invention.

Although the system configuration card has been described in the present application as being used with a system unit such as a computer server, the system configuration card securing mechanism as described could find application for many other system units. Such system units could be stand-alone systems, or could be used as part of a system connected by a network. Moreover, although the present embodiments relate to computer system units, it should be understood that the term "system unit" is not to be limited to computer systems.

In the described example a portable storage device in the form of a smart card is used. It should be noted that the term smart card as used herein is to be understood generally to include cards that have a readable semiconductor memory.

The term smart card as used herein is intended to include devices that include memory only (sometimes known as memory cards) as well as cards that additionally include a microprocessor or microcontroller. It should, moreover, be noted that other forms of portable storage devices could also be used, such as for example a Subscriber Identity Module (SIM) card, a Memory Stick (RTM) or the like, with the device reader and the device receiver being suitably configured to receive and read the device used. Although in the portable storage devices referred to the circuit interface to the outside world is provided by contacts, it will be appreciated that the invention is equally applicable to portable storage devices that have a contactless circuit interface (e.g., using electromagnetic induction). Also, although in the present invention the portable storage device is provided with a notch in an edge of a card, the opening could take other forms such as a hole at (i.e. in the region of) the edge of a card.

What is claimed is:

1. A reading station for reading a portable storage device operable to provide system configuration information to a system unit, the storage device including a circuit, a circuit interface and an opening at an edge of the device, the reading station comprising:
   a housing;
   a device receiver configured to receive the device, the device receiver having a portion external to the housing, said portion being configured to enable a restraint to engage the opening in the device to retain the device at the reading station; and
   a device reader operable to interface with the circuit interface when the device is received by the device receiver.

2. The reading station of claim 1, wherein the device receiver comprises a formation defining a passage configured to receive the portable storage device.

3. The reading station of claim 2, wherein the passage is slot-shaped so as to receive a portable storage device in the form of a system configuration card.

4. The reading station of claim 2, wherein a hole is formed in the formation, which hole passes between opposite surfaces of the formation and through the passage at a position corresponding to that occupied by the opening in the device when the device is received at a reading position in the reading station.

5. The reading station of claim 4, further comprising a restraint that is manually insertable through the hole to engage the opening in the device, thereby retaining the device in the reading station.

6. The reading station of claim 5, wherein the restraint is a padlock.

7. The reading station of claim 5, wherein the restraint is a cable tie.

8. The reading station of claim 5, wherein the restraint is a wire with a seal.

9. The reading station of claim 2, wherein the device receiver is mountable in a wall of a system unit.

10. The reading station of claim 9, wherein the device receiver comprises a first portion of larger cross-sectional area that defines a protuberance to project from the wall and a second portion of smaller cross-sectional area to be received within an aperture in the wall, the passage passing through both portions of the device receiver to define a through passage that passes though the wall of the system unit.

11. The reading station of claim 10, wherein the second portion of smaller cross-sectional area includes wedge-shaped detents configured, for mounting of the device receiver in the aperture in the wall, to pass through the aperture in the wall and to latch behind the wall when the device receiver is fully inserted.

12. The reading station of claim 1 and the portable storage device including:
   a circuit;
   a circuit interface; and
   an opening at an edge of the device.

13. The device of claim 1, wherein the restraint and the opening are external to the housing.

14. A reading station for reading a portable storage device in the form of a system configuration card, the reading station comprising:
   a housing;
   a device receiver defining a slot for receiving the card, the device receiver having a portion external to the housing, said portion being configured to enable a restraint to engage a notch in the device to retain the device within the slot; and
   a device reader including card reader contacts for contacting the circuit contacts on the card wherein the card reader contacts are located so as to contact the circuit contacts on the card when the card is received within the slot.

15. The reading station of claim 14, wherein the first portion comprises a formation including a protuberance, the slot comprising a passage with a slit-shaped cross section that is open at one end of the protuberance and passes through the protuberance in the direction of the device reader.

16. The reading station of claim 14 and the portable storage device, the portable storage device being in the form of a system configuration card, the card comprising:
   circuit contacts; and
   a notch.

17. The computer system of claim 14, wherein the restraint and the opening are external to the housing.

18. A device receiver mountable in a wall, the device receiver comprising a formation having a first portion of larger cross-sectional area, at least partially external to the housing, that defines a protuberance to project from the wall, a second portion of smaller cross-sectional area to be received within an the aperture in the wall, and a passage that passes through both portions to define a passage through the wall, the first portion further comprising a hole formed in the protuberance, which hole passes between opposite surfaces of the protuberance and traverses the passage for receiving a restraint to engage an opening in a the device when the device is received in the device receiver for retaining the device therein.

19. The device receiver of claim 18, wherein the second portion of smaller cross-sectional area includes wedge-shaped detents configured, for mounting of the device receiver in the aperture, to pass through the aperture in the wall of the system unit and to latch behind the wall when the device receiver is fully inserted.

20. The device receiver of claim 18, wherein the passage is slot-shaped so as to receive a portable storage device in the form of a system configuration card.

21. The reading station of claim 18, wherein the portable storage device is a card.

22. A computer system comprising a reading station for reading a portable storage device operable to provide system configuration information to the computer system, the storage device including a circuit, a circuit interface and an opening at an edge of the device, the reading station comprising:

a housing;

a device receiver configured to receive the device, the device receiver having a portion external to the housing, said portion being configured to enable a restraint to engage the opening in the device to retain the device at the reading station; and a device reader operable to interface with the circuit interface when the device is received by the device receiver.

23. The computer system of claim 22, and the portable storage device, the portable storage device being operable to provide system configuration information to the computer system and including:

a circuit;

a circuit interface; and an opening at an edge of the device.

24. The computer system of claim 22, wherein the restraint and the opening are external to the housing.

25. A method of securing a portable storage device operable to provide system configuration information to a system unit in a reading station in the system unit, the method comprising:

providing a portable storage device that includes a circuit, a circuit interface and an opening at an edge of the device;

inserting the device in a device receiving passage in a device receiver until the circuit interface interfaces with a device reader, the device receiver having a portion external to a housing of the reading station, said portion being configured to enable a restraint to engage the opening in the device to secure the device at the reading station; and engaging a restraint with the opening.

26. The method of claim 25, wherein a hole in the device receiver aligns with the opening when the circuit interface interfaces with the device reader, the method further including manually engaging the restraint with the opening in the device.

27. The method of claim 26, wherein the circuit interface comprises circuit contacts.

28. The method of claim 25, wherein the device is a system configuration card.

29. The method of claim 25, wherein the opening comprises a notch in the edge of the device.

30. The method of claim 25, wherein the restraint and the opening are external to the housing.

31. A system for reading a portable storage card, comprising:

a system housing, wherein the system housing comprises a slot for receiving the storage card, wherein the storage card has a first opening;

a formation coupled to the system housing and having a second opening external to the system housing, wherein the second opening at least partially aligns with the first opening when the storage card is inserted into the slot of the system housing; and a restraint located through at least a portion of the second opening and the first opening when the storage card is inserted into the system housing;

wherein at least a portion of the formation is external to the system housing.

32. The system of claim 31, wherein the restraint is located entirely external to the system housing.

33. The system of claim 31, wherein the system is a computer system and the storage card comprises a circuit and a circuit interface.

34. The system of claim 31, wherein the first opening is a notch.

35. The system of claim 31, further comprising a device reader located in an interior of the system housing to interface with the storage card when the second opening at least partially aligns with the first opening.

36. An apparatus comprising:

a device receiver mountable in a wall, the device receiver comprising a formation having a first portion of larger cross-sectional area, at least partially external to the housing, that defines a protuberance to project from the wall, a second portion of smaller cross-sectional area to be received within an aperture in the wall, and a passage that passes through both portions to define a passage through the wall, the first portion further comprising a hole formed in the protuberance, which hole passes between opposite surfaces of the protuberance and traverses the passage for receiving a restraint to engage an opening in a The device when the device is received in a device receiver for retraining the device therein; and the device with the opening, the device being received in the device receiver.

37. The apparatus of claim 36, wherein the device is a card.

* * * * *

UNITED STATES PATENT AND TRADEMARK OFFICE
CERTIFICATE OF CORRECTION

PATENT NO. : 6,837,439 B2
DATED : January 4, 2005
INVENTOR(S) : James Robert Kitchen It is certified that error appears in the above-identified patent and that said Letters Patent is hereby corrected as shown below:

Column 10,
Line 49, please delete "to engage an opening in a the device" and substitute -- to engage an opening in the device --.

Column 12,
Line 39, please delete "engage an opening in a The device when" and substitute -- engage an opening in the device when --.

Signed and Sealed this

Twenty-third Day of August, 2005

JON W. DUDAS
*Director of the United States Patent and Trademark Office*